United States Patent [19]

Jacquemet

[11] Patent Number: 4,553,074

[45] Date of Patent: Nov. 12, 1985

[54] METHOD OF AND APPARATUS FOR THE AUTOSYNCHRONIZATION OF AN ELECTROMAGNETIC HAMMER

[75] Inventor: Georges Jacquemet, Caluire, France

[73] Assignee: MARTELEC Societe Civile Particuliere, Caluire, France

[21] Appl. No.: 520,116

[22] Filed: Aug. 3, 1983

[30] Foreign Application Priority Data

Aug. 3, 1982 [FR] France .................. 82 13950

[51] Int. Cl.⁴ .......................................... H02K 33/00
[52] U.S. Cl. .................................. 318/130; 318/114; 318/132; 310/30
[58] Field of Search ............... 318/122, 123, 127, 128, 318/129, 130, 132; 310/30, 15, 14

[56] References Cited

U.S. PATENT DOCUMENTS

| | | | |
|---|---|---|---|
| 3,118,333 | 1/1984 | Woodward . | |
| 3,649,893 | 3/1972 | Lajoie | 318/128 X |
| 3,787,715 | 1/1974 | Eaton, Jr. | 318/130 |
| 4,049,497 | 9/1977 | McGhee | 318/128 |
| 4,101,816 | 7/1978 | Shepter | 318/130 |
| 4,215,297 | 7/1980 | Jacquemet | 318/130 |
| 4,303,869 | 12/1981 | Baran | 318/130 |
| 4,403,176 | 9/1983 | Cranston | 318/130 X |

FOREIGN PATENT DOCUMENTS

| | | |
|---|---|---|
| 2197418 | 3/1974 | France . |
| 2425302 | 7/1979 | France . |
| 2430827 | 8/1980 | France . |

Primary Examiner—Donovan F. Duggan
Attorney, Agent, or Firm—Karl F. Ross; Herbert Dubno

[57] ABSTRACT

An electromagnet hammer of the type described in U.S. Pat. No. 4,215,297 is autosynchronized by triggering the discharge thyristor in response to the detection of the position of the armature by a proximity detector, or by direct detection of the zero passage of the negative amplitude of the discharge current, or at a reference point representing the position of the armature, with a delay equal to at least half the period of the natural period of oscillation of the armature/plunger and its elastic suspension.

13 Claims, 12 Drawing Figures

METHOD OF AND APPARATUS FOR THE AUTOSYNCHRONIZATION OF AN ELECTROMAGNETIC HAMMER

FIELD OF THE INVENTION

My present invention relates to a method of and to a system for the autosynchronization of an electromagnetic hammer and, more particularly to the synchronization of the triggering of the electromagnetic pulses driving such a hammer with the movement of the magnetically displaceable mass thereof.

BACKGROUND OF THE INVENTION

From my U.S. Pat No. 4,215,297 issued July 29, 1980 and similar publications, it will be apparent that it is known to provide an electromagnetic hammer or other force-impulse tool in which an electromagnetic motor comprises an electromagnet coil adapted to attract an armature of magnetically permeable material so that the armature or magnetic mass, which can form part of a plunger or ram can generate an impact which is transmitted to a drill, chisel or other "bit" forming the working end of the tool.

The electromagnet is energized by an energy-storage element in the form of a capacitor or condenser which is charged through an inductor under the control of a first thyristor and which discharges to generate the electric current pulse of short duration within the coil to attract the armature and generate the percussive force on the percussion tool.

This discharge is controlled by a second thyristor and the gates or control electrodes of the two thyristors are connected to an electronic command circuit alternately triggering the thyristors by signal pulses alternately delivered thereto.

The mobile magnetic mass constituted by the armature plunger or ram can be suspended elastically and in this case, the spring suspension defines with a mobile mass a damped oscillating system. As will be developed below, when the electromagnetic impulse is applied out of synchronization with the movement of the magnetic mass, the force can be dissipated. However, when synchronization is provided, the force generated by the electromagnetic action can add to the force contributed by the oscillating system.

Thus it is important that the electrical impulses generated by the command circuit be in synchronization with the movement of the mobile mass.

It has been found to be difficult in the past to achieve this synchronization. For effective synchronization, for example, complex measuring and analytical circuitry and devices were required and, for example, oscilloscopes and the like were necessary.

OBJECTS OF THE INVENTION

It is the principal object of the present invention to provide an improved method of synchronizing the energization of the coil with the movement of the suspended mass of an electromagnetic hammer whereby disadvantages of earlier systems are obviated.

Another object of this invention is to provide an improved apparatus or control circuit for synchronizing an electromagnetic hammer.

SUMMARY OF THE INVENTION

These objects and others which will become apparent hereinafter are attained, in accordance with the present invention, in a method of autosynchronizing the function of an electromagnetic hammer wherein the pulses applied to the discharge-controlling thyristor are released or triggered at an instant determined or measured from the point at which the negative intensity of the discharge current traversing the coil is canceled or nullified for the first time after a period at least equal to the half period of the mechanical oscillation of the mobile suspended mass.

According to the invention, therefore, I can detect directly the first zero passage of the negative intensity of the discharge current traversing the coil of the electromagnet and can trigger the command pulse for the discharge thyristor after a period at least equal to the half period of the mechanical oscillation of the mobile suspended mass starting from this detection of the first zero passage.

In another embodiment of the invention, the second zero passage of the negative intensity is detected and the command pulse for the discharging thyristor is triggered after a period at least equal to a quarter of the mechanical oscillation period of the mobile suspended mass starting from the detection of the second zero passage of the intensity of the discharge current of the condenser traversing the coil.

In either of these two modes of operation, the command pulse for the charging thyristor can be triggered after a predetermined period measured from the detection of the first or second zero passages of the intensity.

In yet another embodiment of the invention, the command pulse for the discharge thyristor is triggered after a period at least equal to a half period of the mechanical oscillation of the mobile suspended mass, but measured from the instant at which the command pulses are generated for the charging thyristor.

The apparatus of the invention thus includes means for measuring the zero passage of the negative intensity of the discharge current traversing the electromagnet coil and timer means responsive to this zero passage for triggering the generation of the respective command pulses.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
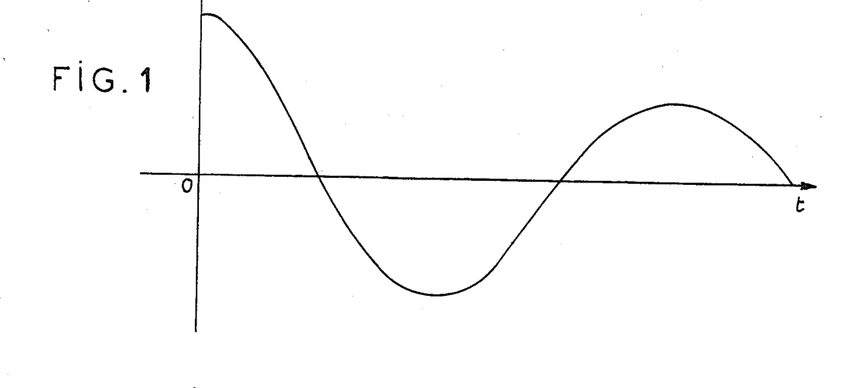
FIG. 1 is a graph of the displacement x of the mobile mechanical mass, i.e. the armature, as elastically suspended in an electromagnetic hammer, versus time t, showing the damped oscillation which such a mass would normally undergo.

In FIG. 1 I have shown the damped oscillation which results when an elastically suspended magnetic mass, e.g. the magnetic mass of the electromagnetic hammer of my aforementioned patent, is displaced from its rest position by the displacement x and undergoes damped oscillation. With each half cycle, the intensity diminishes as demonstrated in FIG. 1.

Figure 2:
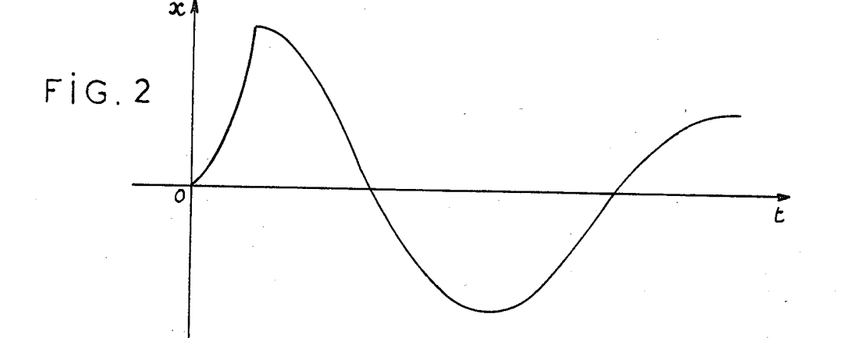
FIG. 2 shows the damped oscillation upon which an electromagnetic pulse is applied in the rest position.

If one applies a force impulse to the mass from its rest position zero (FIG. 2) to displace the mass and initiate the damped oscillation, the decay is represented in FIG. 2.

Figure 3:
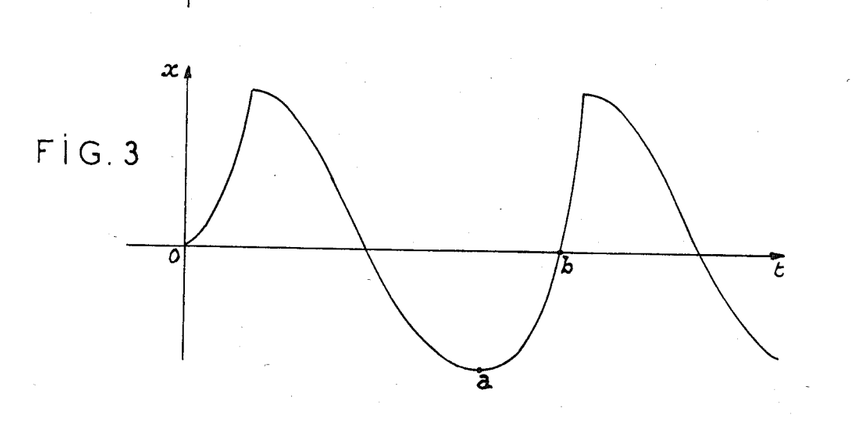
FIG. 3 is a similar graph of displacement versus time in which periodic pulses are applied to maintain a sustained (undamped) oscillation, showing the region in which a synchronized pulse would have to be applied.

If the pulses are applied in a periodic fashion, in phase with the displacement of the mobile mass, the oscillation is undamped and the displacement curve is in the form illustrated in FIG. 3.

In all of FIGS. 1-3, the displacement x is plotted along the ordinate against time t which is plotted along the abscissa.

In order to have a regular reproducible movement, utilizing the impulsive application of force, and acting in one direction, the ascending portion of the curve, i.e. between points a and b as shown in FIG. 3, i.e. during the time in which the impulsive force and the elastic restoring force are in the same direction. In this case, therefore, the electromagnetically applied force does not counteract the elastic force.

The impulsive force is, of course, the magnetic force resulting from the application of an electric current pulse, through the coil of the electromagnet which constitutes the motive member of the electromagnetic hammer. To achieve this result, the triggering pulse must be generated in synchronism with the movement of the suspended mass so that the discharge pulses are applied at the instant at which the armature in the coil is in a position in which the self-induction in the coil corresponds in direction to that of the applied current.

As has already been noted, this type of synchronization is difficult to achieve with prior art systems even with complex analysis and measuring instruments such as oscilloscopes.

Figure 4:
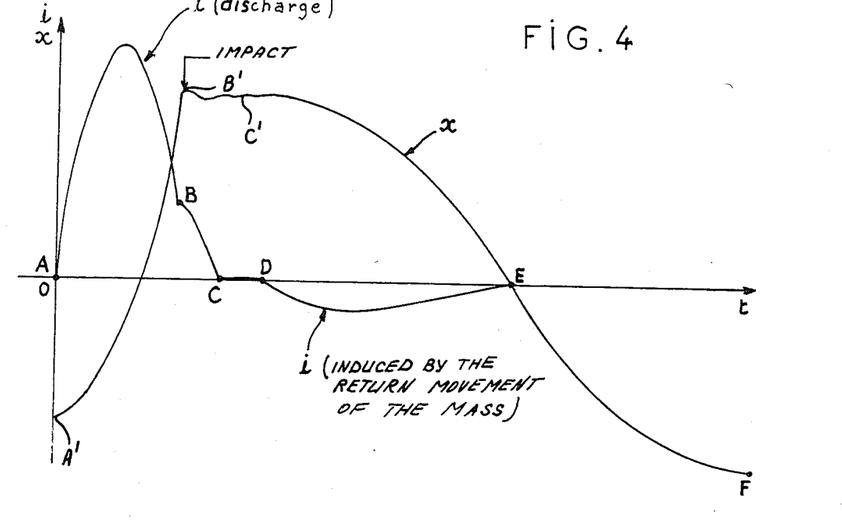
FIGS. 4 and 5 are graphs illustrating the principles of the present invention and in which time is plotted along the abscissa but the discharge current and the displacement are both plotted along the ordinate.
Figure 5:
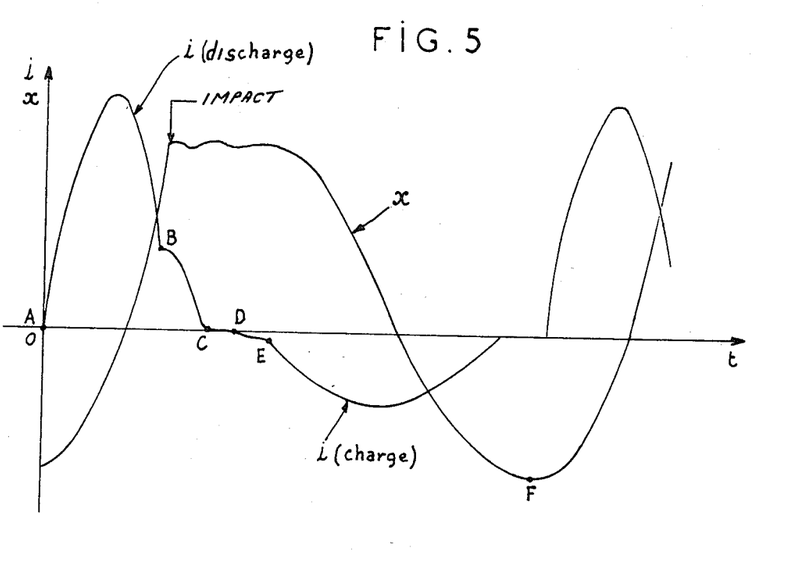

The problem presented, which has not been satisfactorily solved heretofore, is illustrated more precisely with reference to FIGS. 4 and 5 which also demonstrate the concept underlying the instant invention.

FIG. 4 shows two curves plotted in superimposition. The curve x represents the displacement curve and the curve i represents the current intensity or amplitude through the coil and the charging inductance of the condenser in that portion of the electric circuit common to the charge and discharge functions of the condenser. The magnitudes of displacement and current are plotted along the ordinate whereas time t is plotted along the abscissa in both of these figures. The curves of FIG. 4 are those which are actually detectable in an operating electromagnetic hammer during the functioning thereof.

The electric current discharged by the condenser through the electromagnetic coil creates the magnetic field whose impulsive magnetic force is applied to the movable armature.

In FIG. 4, the positive part of the intensity curve i between points A and B corresponds to the electrical discharge and the movement of the armature is represented by the corresponding segment between points A' and B' of the displacement curve x. The points B and B' represent the instant of impact of the plunger or ram against the anvil formed by the tool bit.

Between points B and C, the intensity curve i corresponds to the magnetic force due to the hysteresis of the magnetic circuit which holds the magnetic mass generally against the impact surface, although with some rebounding as is indicated along the plateau C'.

Between points C and D, the movement of the mass is practically zero and the intensity i is likewise about zero.

Between the points D and E, the remnant magnetic force does not equilibrate with the spring force which acts in the opposite sense and under the action of the spring force the movable armature undergoes its return to its original position.

However, the armature is magnetized and the movement of this magnetic mass under the action of the elastic force induces an electromotive force in the coil with a corresponding flow of current. As a result, between the points D and E the intensity i of the current traversing the coil goes negative, passing through a zero value at the point E which corresponds to the point of the equilibrium between the elastic point and the magnetic force. This generally corresponds to the rest position of the mobile mass and can be termed point zero. The beginning of the return movement of the mobile mass coincides with the point D, the instant at which the intensity i for the first time undergoes a zero passage.

The detection of the instants at which the intensity of the current traversing the coil becomes negative, passing and repassing the zero points in the intensity curve, permits a determination as to time of the two positions of the movable mass in space. The first zero passage occurs at D and signals the instant at which the movable mass begins its return movement. The second zero passage at E determines the instant at which the movable mass in space within the coil passes the zero point or rest position in its path.

Starting from the knowledge of these two instants, it is possible to determine the moment at which the movable mass, under the action of the elastic force, attains its maximum amplitude in the return position, designated at F in FIG. 4.

The characteristics of the mechanical oscillating system are defined by the elasticity constant and by the mass of the moving system. These two components can be measured and the duration of the natural mechanical oscillation period readily calculated.

The time between the point D and point F corresponds to half of the natural frequency of oscillation of the mechanical system, i.e. to the so-called half period. The time between points E and F corresponds to a quarter of the natural mechanical oscillation period. These two intervals can be readily established from the known values of the oscillating system.

The detection of the point E is particularly valuable for especially low frequency operations where the charge of the condenser is discharged after return of the movable mass to its zero point or rest position. When, however, the system functions at a much higher frequency, it is advantageous to discharge the condenser before the return of the mechanical system to its zero point or rest position and thus one can use the detection of the point D, i.e. the first zero passage.

It is also possible to use the detection of the zero point D when the material employed for the movable armature has a long hysteresis cycle which brakes the return of the motors under the action of the elastic force. The principle of this system has been illustrated in FIG. 5.

FIG. 5 relates to an electromagnetic hammer functioning generally in the manner described above in connection with FIG. 4 and the curves x and i also represent the movement of the elastically suspended mass and the current through the coil, respectively.

As in FIG. 4, the stretch from point A of the current curve i to the point B represents the electrical discharge and the point B corresponds to the instant of impact. From point B to point C the current curve represents the hysteresis of the magnetic circuit during which the suspended system is maintained at the force transmission or impact point with possible rebounding.

From point C to point D, the movement of the mass is practically zero and the intensity of the current is equally about zero, corresponding to the first zero passage. From point D to point E, the intensity goes weakly inactive and corresponds to a slow return movement of the elastically suspended mass toward its rest position.

At point E, the charging of the condenser through inductance is triggered and a secondary effect of this is to reverse sharply the current through the coil of the electromagnet and to suppress the magnetic forces produced by the magnetic remnants.

At this point, the mobile mass is acted upon solely by the elastic force of the mechanical system which carries it past its rest position to the maximum displacement F on the opposite side of the rest position. Its displacement with time and in space, once the magnetic contribution to the force acting thereon is nullified, is determined exclusively by the mechanical characteristics of the oscillating system.

In this embodiment, point E corresponds to the instant at which the charging of the condenser begins and also corresponds to the point at which the return movement of the movable mass commences. The instant corresponding to the point E is determined by the electronic circuit triggering the charging thyristor and this does not require any particular detection. The interval between points E and F corresponds to half of the mechanical oscillation period, i.e. half the natural frequency of oscillation of the mechanical system.

From the constraints developed above, the method of the invention will be clear in the autosynchronization of the electromagnetic hammer. According to the invention, the discharge thyristor is triggered by a command pulse from the circuit at the instant at which the negative intensity of the discharge current of the condenser traversing the coil is canceled for the first time, after a period at least equal to half the oscillation period and thus the half period of the natural frequency of the suspended movable mass.

The first zero passage can be detected directly for the negative intensity of the discharge current of the condenser traversing the electromagnet coil and then a command pulse in the discharge thyristor can be triggered after a delay at least equal to the half period of the natural frequency of the suspended mass measured from the detection of this zero passage. This amounts to a detection of the point D (FIG. 4) and the autosynchronization is based upon this point as the reference point from whih the delay is measured.

In the second mode of operation, the second zero passage of the negative intensity of the discharge current of the condenser traversing the electromagnet coil is detected and the command pulse for triggering the thyristor is generated by the control circuitry after a delay at least equal to a quarter of the natural oscillation period of the suspended mobile mass. The reference point in this case is the point E and hence this latter point serves as the basis for autosynchronization (FIG. 4).

In both cases the autosynchronization is based upon the relationship between the zero passage of the current amplitude and the known position of the movable armature within the coil.

The command pulse for the charging thyristor is triggered after a delay which is predetermined and which is measured either from the detection of the first zero passage of the current amplitude or from the detection of the second zero passage of the current amplitude.

According to another embodiment of the process of the invention, the autosynchronization commands of an electromagnetic hammer are generated without direct detection of the zero passage of the current amplitude by triggering the command pulse for the discharge thyristor after a time equal to the half period of the natural frequency of oscillation of the mobile suspended mass measured from the instant at which the charging triggering pulse is generated, since this instant also corresponds to a known position of the movable armature within the coil as noted with reference to FIG. 4.

Thus while detection of the zero passage represents the best mode of carrying out the method of the invention, it is also possible to use as the reference point for the delay after which the discharge thyristor is triggered, a reference point in fixed relationship to the zero passage, such as the point at which the charging of the condenser is triggered.

The apparatus according to the invention for the autosynchronization of an electromagnetic hammer generally comprises a circuit producing a pulse of duration equal to a predetermined fraction of the mechanical oscillation period, a circuit receiving this pulse and triggering through the intermediary of a first interface circuit the discharge thyristor for the condenser, a circuit producing another pulse of predetermined duration, and a circuit receiving this other pulse and controlling through the intermediary of a second interface circuit the charging thyristor for the condenser.

Naturally, this apparatus will comprise the electromagnetic drive of the conventional electromagnetic hammer, i.e. the armature connected with the ram or plunger and receivable within an electromagnetic coil, a condenser whose discharge generates the pulse whose current through the coil operates the electromagnetic drive, a discharge thyristor connected in circuit with the condenser and the coil, and a charging thyristor connected in circuit with a source of charging current, a charging inductance, and the coil.

According to a first embodiment of the apparatus of the invention, the circuitry which produces a pulse of duration equal to a predetermined fraction of the mechanical oscillation period, operating the discharge thyristor and the circuit producing the pulse of predetermined duration for operating the charge thyristor are respectively controlled by a zero passage detection circuit connected to a sensor for the negative amplitude of the discharge current of the condenser.

This sensor or detector can be a resistor disposed in series with a diode to form a network bridged across the discharge condenser. The potential tapped across this resistor can be applied to the primary winding of a step-up transformer raising the voltage and applying the higher voltage signal to the zero-passage detector circuit.

The autosynchronization is in this case triggered utilizing the zero passage of the current amplitude and connected to this zero-passage detector may be a circuit which can be considered a timing circuit for producing a pulse of a duration equal to at least a half period of the mechanical oscillation of the system or at least a quarter of the period of the oscillation, depending upon whether one exploits the first or second zero passage.

In the second embodiment of the invention, the circuit producing the pulse of a duration equal to a predetermined fraction of the mechanical oscillation period and, more particularly, to a duration at least equal to the half period of the mechanical oscillation, is disposed between the circuit operating the charging thyristor via the second interface circuit, and the circuit operating the discharge thyristor through the first interface circuit, while the circuit providing the other pulse of predetermined duration is interposed between the circuit operating the discharge thyristor and the circuit operating the charge thyristor, the duration of this other pulse being equal to the duration of conduction of the discharge thyristor.

The system is thus a loop in which the command pulse for the discharge thyristor is triggered by the command signal for the charge thyristor, thereby eliminating the need for a detector of the zero passage and affording an especially simple and economical arrangement.

Figure 6:
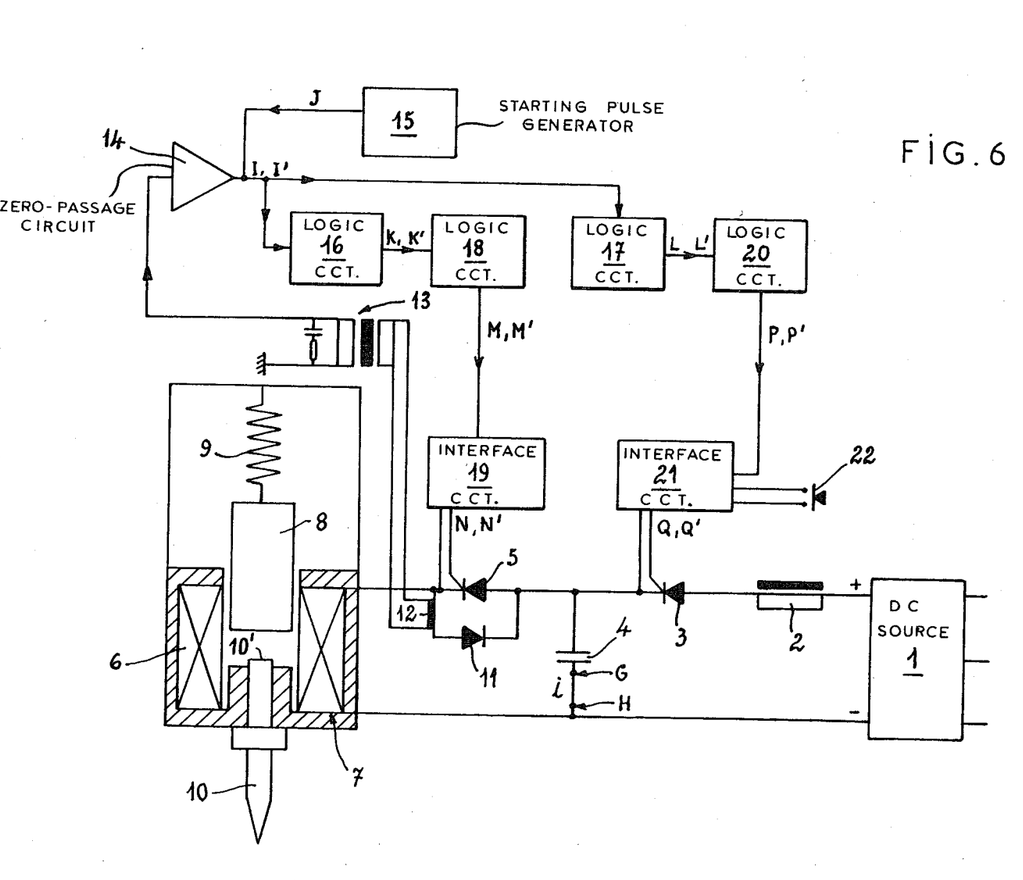
FIG. 6 is a block diagram of a control circuit illustrating the principles of the present invention.

More particularly, I have shown in FIG. 6 a control circuit for an electromagnetic hammer which is illustrated highly diagrammatically.

This hammer utilizes a direct current source 1 which can be connected to an alternating current line in the usual manner, an inductance 2 connected in series with this source and a charging thyristor 3 in series with the inductance and a condenser 4 which can be charged so as to discharge through the coil of the electromagnetic hammer. The thyristor 3 is the first or charging thyristor.

The discharging circuit includes the second or discharging thyristor 5 in series with the condenser 4 and the coil 6 of the electromagnetic hammer. The coil 6 forms part of an electromagnet 7 whose armature plunger 8 extends into the coil and forms a ram which can be electromagnetically driven by an electric discharge through the coil, against the anvil 10' formed by the upper end of a tool 11.

The armature plunger 8 is suspended elastically as represented by a spring 9 so that members 8, 9 represent an elastically suspended mass which has a natural frequency of oscillation corresponding to the frequency of the mechanical system.

A diode 11 connected in series with a resistor 12 is bridged across the discharge thyristor 5 so that a current through the resistor 12 is proportional to the discharge current through the coil and a voltage is tapped across the resistor which thus represents the discharge current. The diode 11 permits passage of the negative amplitude of the current discharging the condenser 4.

Apart from the circuit element 12, the circuitry described is similar to and operates in the manner described in my aforementioned patent.

The current common to the discharge and charge branches of the circuit has been represented at i in FIG. 6 so as to be consistent with the showings in the earlier figures and can be considered the current measured between the points G and H.

According to the invention, the voltage tapped across the resistor 12 follows in phase the current through the diode 11 and thus is in phase with the negative amplitude of the discharge current. This current is of such a small value that it does not disturb the operation of the circuit.

This voltage is applied to the primary winding of a voltage-raising transformer 13 which delivers a signal in the form of a time-varying voltage representing the current traversing the resistor 12 to a zero-passage detector 14. This voltage, of course, also has zero passages which correspond to the zero passages of the discharge current through the coil 6.

Figure 7:
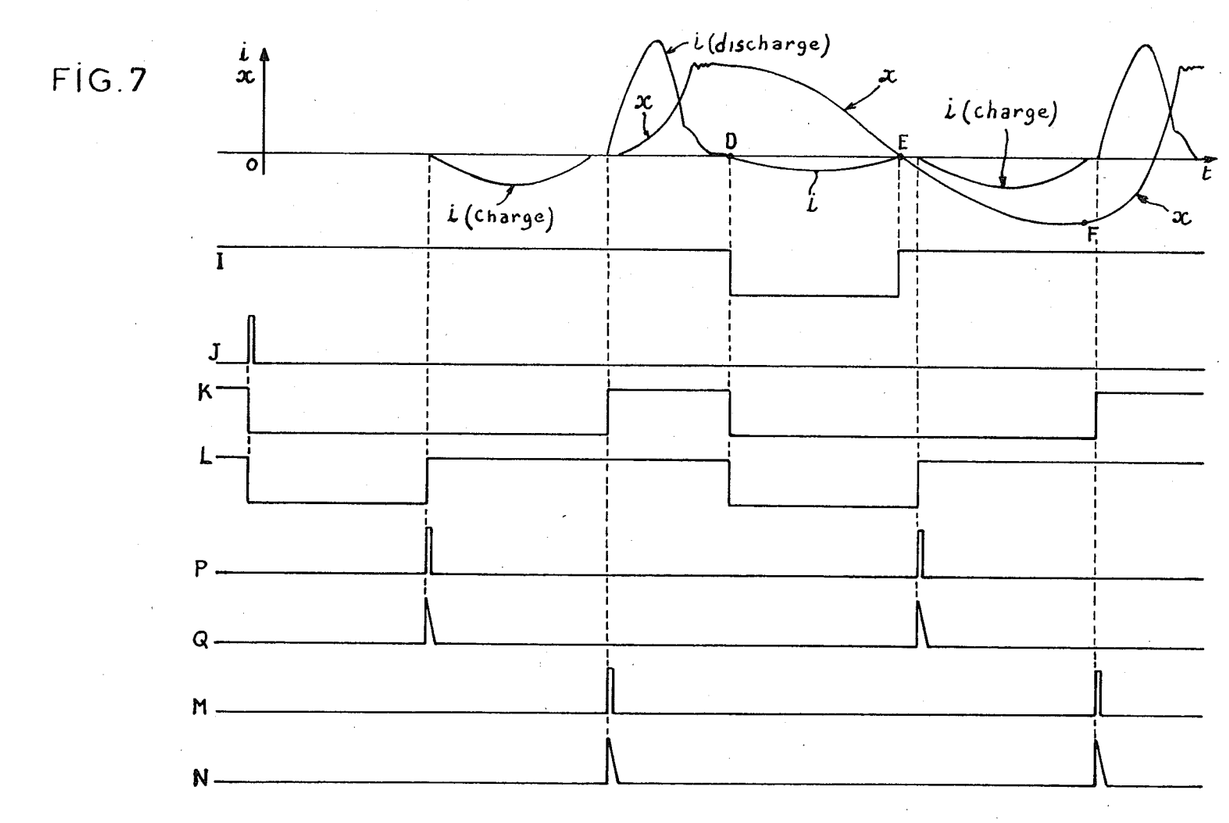
FIG. 7 is a pulse diagram illustrating the operation of the circuit of FIG. 6.
Figure 8:
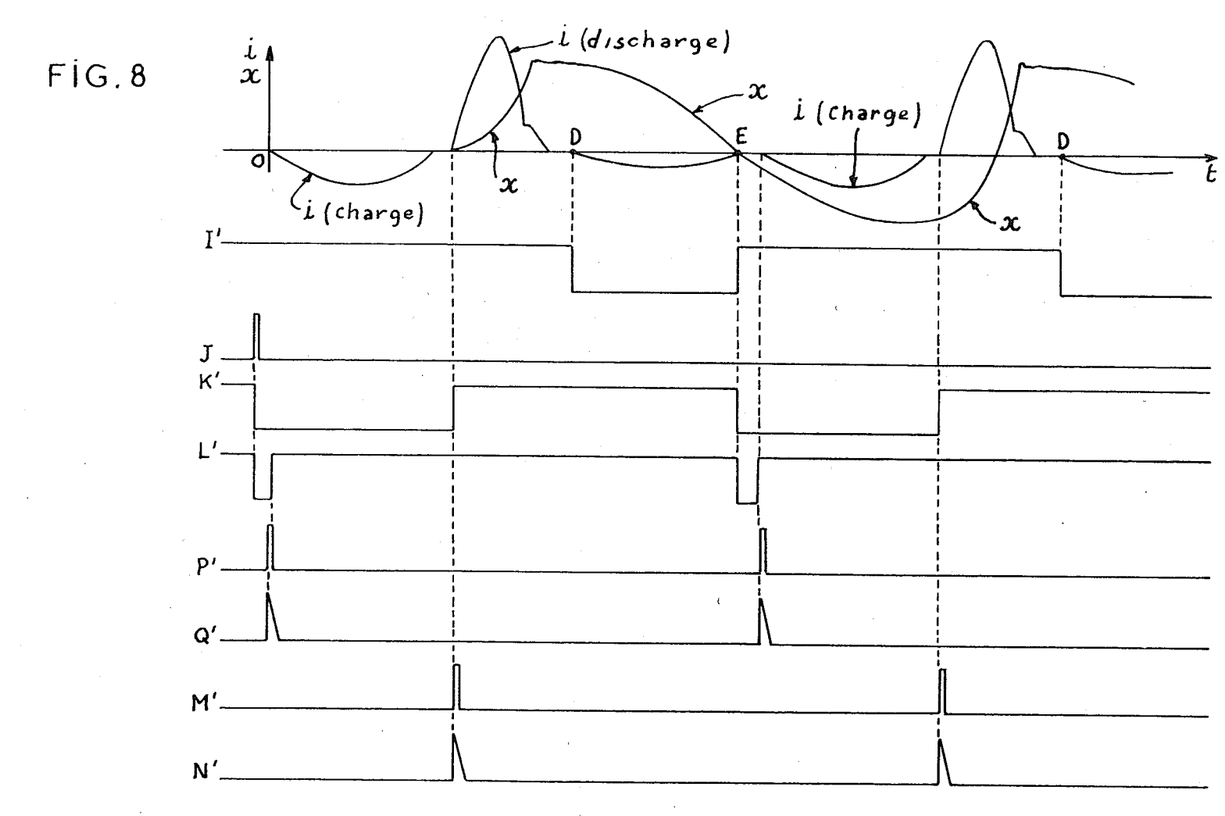
FIG. 8 is another pulse diagram showing another mode of operation of the circuit of FIG. 6.

The zero passage circuit 14 produces rectangular flanks I or I' at each zero passage representing the start and end of a zero passage of the negative intensity of the current I traversing the coil (see the top of FIGS. 7 and 8).

The detection signal produced by signal 14 can be used by exploiting either the first zero passage (point D) or the second zero passage (point E).

In the first case, illustrated by FIG. 7, after the system has been placed in operation by a pulse J from the starting circuit 15, the signal produced by the zero-passage detector at point D triggers in parallel logic circuits 16 (first circuit) and 17 (fourth circuit). Logic circuit 16 produces a pulse K of a duration at least equal to the half period of the mechanical oscillation. The logic circuit 17 produces a pulse L of a predetermined duration which determines the instant at which the charge of condenser 4 is triggered.

The termination of pulse K produces in a second logic circuit 18 (second circuit) which can constitute a pulse-former, a short rectangular wave pulse M which is applied to the interface circuit 19 (third circuit) controlling the discharge thyristor 5 and applying the triggering pulse N, i.e. a spike, thereto.

The termination of the pulse L produced by the logic circuit 17 triggers in the pulse-former logic circuit 20 (fifth circuit) a pulse P of short rectangular wave form which is applied to the second interface circuit 21 (sixth circuit) to produce the spike Q which is applied as the triggering pulse to the charging thyristor 3.

Thus the line Q in FIG. 7 represents the pulses delivered by the interface circuit to the thyristor 3.

A manual override switch 22 is associated with the interface circuit 21 to maintain the condenser 4 discharged when the apparatus is not in use.

In the second case represented in FIG. 8, the signal produced by the second zero passage at point E is applied to the logic circuit 16 which produces a pulse K' of a duration of at least equal to a quarter of the oscillation period of the mechanical system. Similarly the zero-passage circuit triggers the logic circuit 17 to produce pulse L' of a predetermined duration establishing the instant at which the charging of the condenser is triggered.

In this embodiment, the termination of the pulse K' produced by the circuit 16 results in the generation of the logic circuit 18 of a pulse M' which, when applied to the interface circuit 19 produces the spike N' for triggering the discharge thyristor 5.

The termination of pulse L' produced by the circuit 17 generates the rectangular pulse P' which, when applied to the logic circuit 21, results in the spike Q' triggering the charging thyristor 3.

In the two cases the autosynchronization is effected utilizing a command pulse N or N' to the discharge thyristor 5 which is triggered by a signal I or I' from the zero detector 14 and via a logic circuit 16 which can produce a pulse of a duration determined by the characteristics of the mechanical oscillating system.

Figure 9:
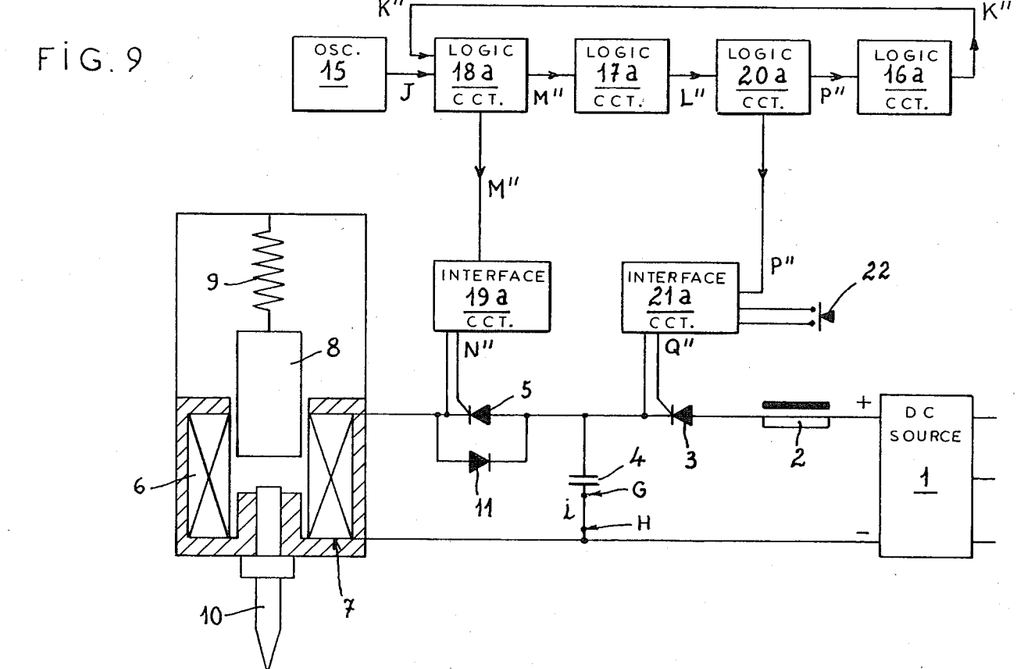
FIG. 9 is a diagram similar to FIG. 6 in another embodiment of the invention.
Figure 10:
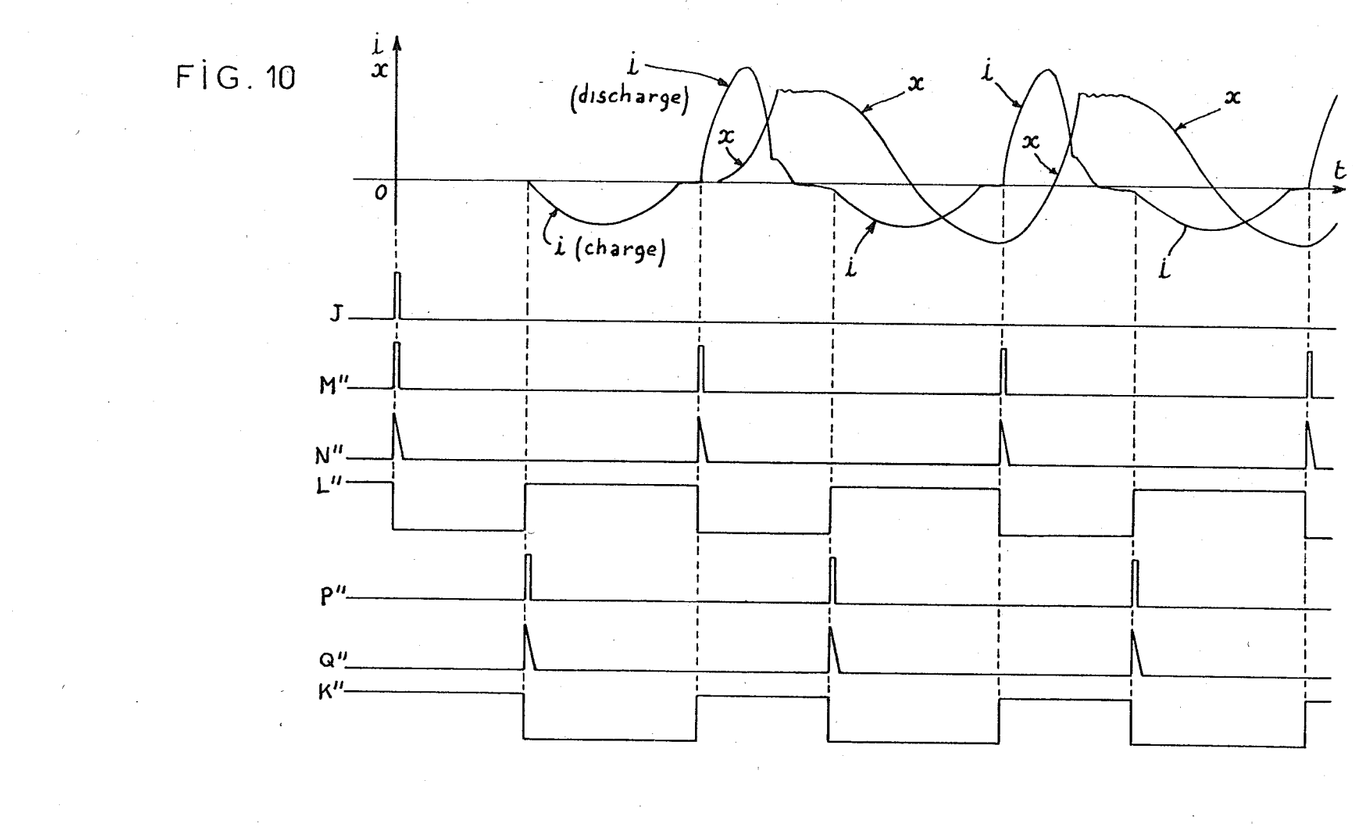
FIG. 10 is pulse diagram for the circuit of FIG. 9.

In FIG. 9, however, I have shown a system which does not require zero-point detection and whose functioning is explained with reference to the pulse diagram of FIG. 10.

The elements of FIG. 9 which correspond to those of FIG. 6 bear the same reference numerals and are not described in any detail at this point.

In this embodiment, however, the starting pulse generator or oscillator 15 applies a pulse J to a first logic circuit 18a producing a pulse M" of short duration which triggers, in parallel, the interface circuit 19a applying the triggering spike N" to the discharge thyristor 5 and, in parallel therewith, a second logic circuit 17a providing a pulse L" of a duration equal to the period of conduction of the discharge thyristor 5.

The trailing flank or end of the pulse L" produces in a third logic circuit 20a a short duration pulse P" which triggers in the interface circuit 21a the spike Q" which unblocks thyristor 3 for the charging of the condenser 4.

The pulse P" is also applied to a fourth logic circuit 16a producing a pulse K" of a duration at least equal to the half period of the oscillation of the mechanical system and which is applied to the first circuit 16a in a closed loop to permit the cycle to begin again.

In the two main embodiments described, the duration of the various pulses are controllable by appropriate means not shown with advantages in addition to those of autosynchronization.

In the first case, for example, a variation of the operating frequency can be obtained. For example, if the period of mechanical oscillation is represented at T, a high frequency operation will apply where the impulse duration Timp=T/4 and satisfactory operation can also apply where Timp=5T/4 and Timp=9T/4. Infinite variability is not possible because of the damping of the mechanical oscillation.

In the second case, a variation in the operating frequency can be similarly obtained. The most rapid frequency utilizes a pulse duration of the synchronizing pulse Timp=T/2 while low frequency operations can use Timp=3T/2 and Timp=5T/2. In this case as well infinite regulation is not possible because of the damping of the mechanical oscillation.

In the second case, it is possible to vary the duration of pulse L" corresponding to the conduction of the discharge thyristor 5 and to obtain a variation of the operating frequency associated with a variation in the power of the impact. In this case, the charging voltage of the condenser will be a function of the reverse voltage of the condenser at the instant at which charging is triggered and of the supply voltage. The charging voltage thus will vary as a function of the instant at which charging is triggered. The energy supplied to the tool can thus be varied by up to about 30%.

Figure 11:
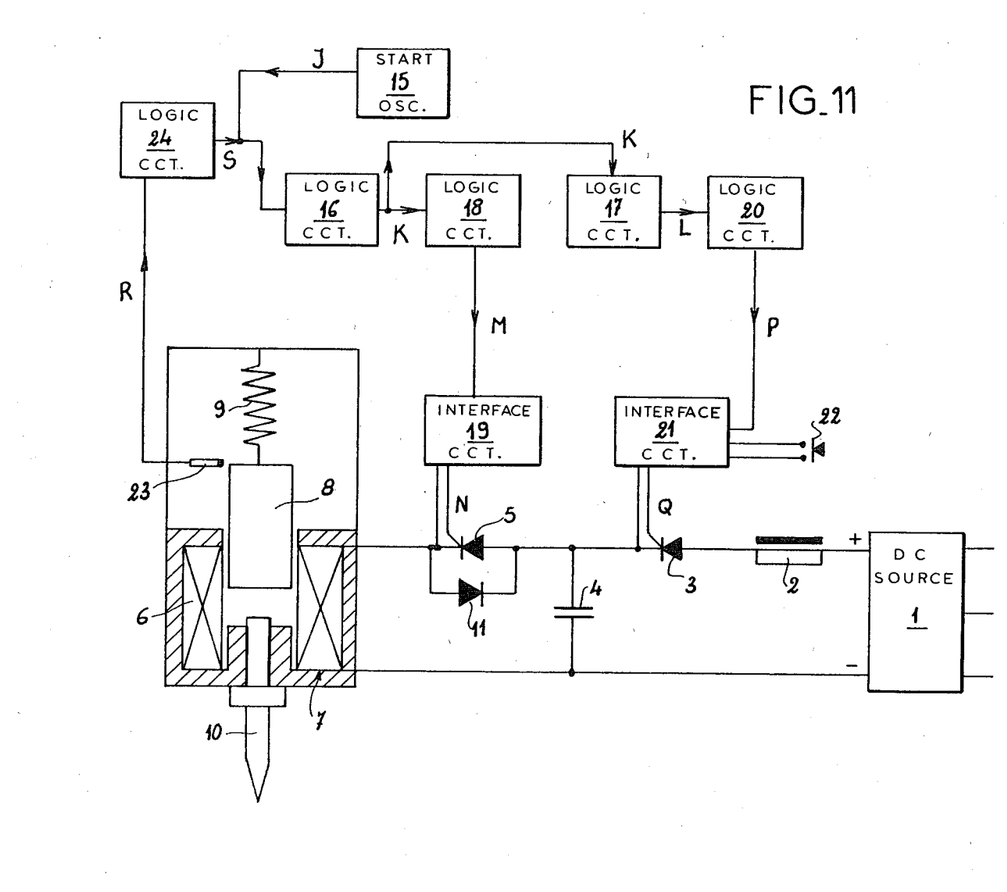
FIG. 11 is a block diagram of still another operating system for the electromagnetic hammer.

FIG. 11 shows a third embodiment of the invention, again, those operations having the same function as corresponding elements in FIG. 6 have the same reference numerals. In this embodiment, however, the position of the movable armature 8 of the electromagnet 7 is detected directly by a proximity sensor 23 producing a signal R when the upper end of the armature reaches this detector so that the position of the armature in space and in time can be ascertained.

The detector 23 can be disposed anywhere along the path of the armature as may be required but is preferably mounted so as to be juxtaposed with the equilibrium position at rest which corresponds to the zero point previously described.

The signal R produced by the sensor 23 is delivered to a logic circuit 24 which transforms the signal R into a rectangular pulse S (FIG. 12) of a duration such that the second signal produced by the detector 23 at the descent of the armature 8 is canceled.

The signal S thus triggers autosynchronization in the same manner as the circuit of FIG. 6 utilizing essentially the same circuit elements designated with the same reference numerals and not, therefore, requiring a detailed description.

The leading front of the rectangular signal S is applied to the logic circuit 16 which produces a pulse K (FIG. 12) of a duration at least equal to a quarter of the oscillating period of the mechanical oscillating system. The trailing end of pulse K produced by the circuit 16, is applied to the logic circuit 18 in parallel to the logic circuit 17.

The logic circuit 18 generates a pulse M which is applied to the interface circuit 19 and generates the triggering spike N for the discharge thyristor 5. The logic circuit 17 on the other hand produces a pulse L whose duration corresponds to the duration of conduction of the discharge thyristor 5. The decay of the pulse L produces in the logic circuit 20 a short rectangular pulse 9 which is applied to the interface 21 generating the triggering spike Q for the charging thyristor.

The interface circuits, of course, are merely pulse shapers which convert the decay of the rectangular input pulses thereto into triggering spikes.

Figure 12:
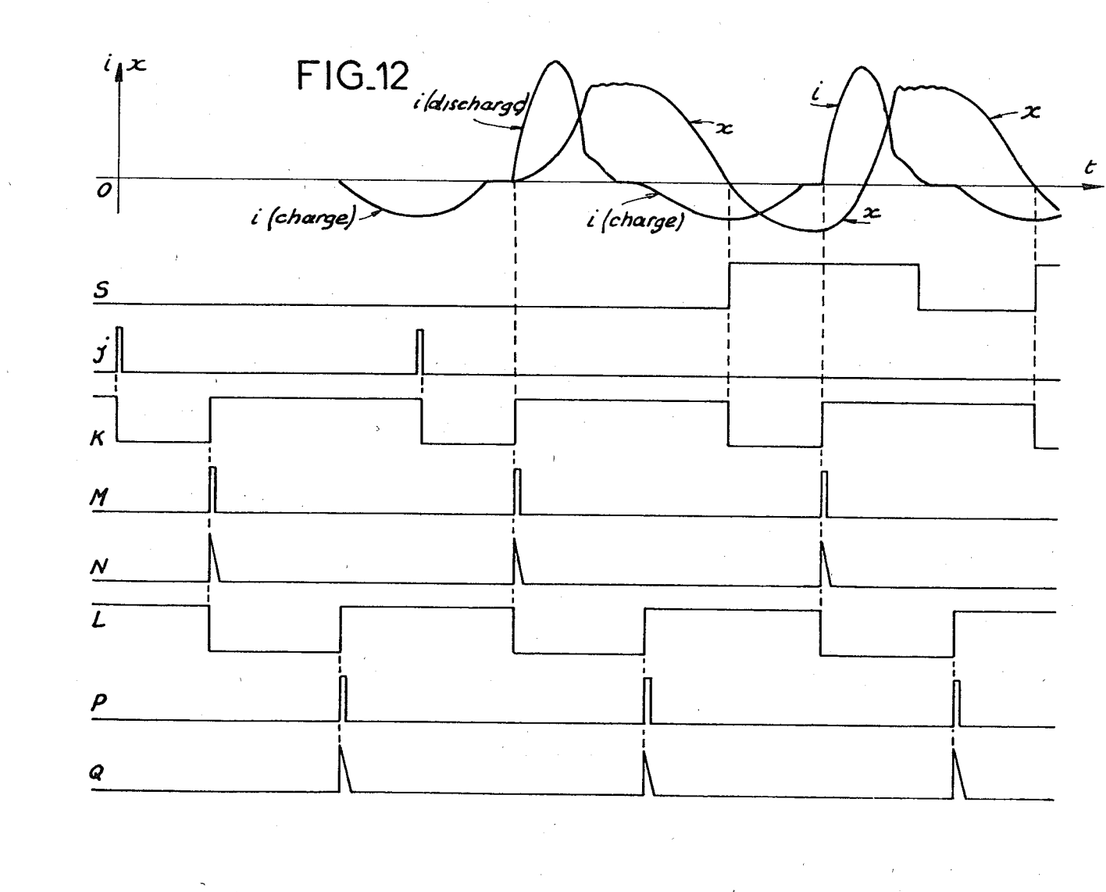
FIG. 12 is another pulse diagram, here illustrating the operation of the circuit of FIG. 11.

A starting pulse oscillator 15 permits the system to be set in operation and in this embodiment two starting pulses J are required (see FIG. 12).

As will be evident, the invention is deemed to include all variations and modifications within the spirit and scope of the appended claims, including those in which the various logic circuits are integrated with one another or replaced by a single circuit such as a microprocessor with appropriate memory means for the various functions and durations.

I claim:

1. In a method of autosynchronously operating an electromagnetic hammer comprising an electromagnet having a coil within which an elastically suspended plunger armature is displaceable in successive operation cycles by energization of the coil to generate an impact upon the discharge of a condenser under the control of a discharge thyristor through the coil, the condenser being charged from a direct current source through an inductance under the control of a charging thyristor in series with the coil, the improvement which comprises:

generating a command pulse triggering said discharge thyristor at a predetermined interval at least equal to the half period of the natural oscillation frequency of said plunger armature and its elastic suspension after the negative amplitude of the discharge current from the condenser through the coil attains a zero value for the first time in each operating cycle of the hammer so that triggering of the hammer is controlled on an impact-by-impact basis in accordance with its position resulting from a previous triggering.

2. The improvement defined in claim 1, further comprising the steps of directly detecting the first zero passage of the negative amplitude of the discharge current through said coil and triggering said command pulse after an interval at least equal to the half period of said oscillation frequency as measured from the detection of the first zero passage.

3. The improvement defined in claim 1 which comprises detecting directly the second zero passage of said amplitude in each cycle of the discharge current of said condenser through said coil and triggering said command pulse after a period at least equal to a quarter of the period of said oscillation frequency as measured from the detection of the second zero passage.

4. The improvement defined in claim 2, further comprising the step of generating a command pulse triggering said charging thyristor after a predetermined interval measured from the detection of said first zero passage.

5. The improvement defined in claim 3, further comprising the step of generating a command pulse triggering said charging thyristor after a predetermined interval measured from the detection of said second zero passage.

6. The improvement defined in claim 1 wherein the command pulse triggering said discharge thyristor is triggered after a period at least equal to said half period and measured from the instant of triggering the charging thyristor.

7. In an electromagnetic hammer comprising an electromagnet having a coil within which an elastically suspended plunger armature is displaceable in successive operating cycles by energization of the coil to generate an impact upon the discharge of a condenser under the control of a discharge thyristor through the coil, the condenser being charged from a direct current source through an inductance under the control of a charging thyristor in series with the coil, the improvement which comprises for autosynchronization:

a first circuit producing a pulse of a duration equal to a predetermined fraction of the period of the natural oscillation frequency of the plunger armature and its elastic suspension;

a second circuit receiving said pulse and generating another pulse;

a third circuit forming an interface and receiving said other pulse for generating a spike triggering said discharge thyristor for discharging said condenser through said coil;

a fourth circuit producing a further pulse of a predetermined duration;

a fifth circuit receiving said further pulse; and a sixth circuit forming an interface and connected to said fifth circuit for generating a spike triggering said charging thyristor.

8. The improvement defined in claim 7 wherein at least one of said first and fourth circuits are triggered by a zero passage detector connected to a sensor of the negative amplitude of the discharge current of said condenser.

9. The improvement defined in claim 8 wherein said sensor includes a resistor from which a voltage is tapped by a transformer to said zero passage detector, said resistor being connected in series with a diode across said discharge thyristor.

10. The improvement defined in claim 7 wherein said first circut produces a pulse of a duration at least equal to the half period of said frequency and is connected between the fifth circuit and the second circuit while the fourth circuit is connected between the second circuit and the fifth circuit, the duration of said further pulse being equal to the duration of conduction of said discharge thyristor.

11. The improvement defined in claim 7, further comprising a proximity detector responsive to the position in space of said armature, and connected to said first circuit for directing the operation thereof.

12. The improvement defined in claim 7, further comprising a starting pulse generator connected to one of said circuits for initiating operation thereof.

13. The improvement defined in claim 12 wherein said starting pulse generator is an oscillator.

* * * * *